United States Patent
Clark

(10) Patent No.: US 12,330,582 B1
(45) Date of Patent: *Jun. 17, 2025

(54) INITIATOR FOR A GAS GENERATOR OF A VEHICLE SAFETY DEVICE

(71) Applicant: Autoliv ASP, Inc., Ogden, UT (US)

(72) Inventor: Marcus Clark, Kaysville, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/611,822

(22) Filed: Mar. 21, 2024

Related U.S. Application Data

(63) Continuation-in-part of application No. 18/541,039, filed on Dec. 15, 2023, now Pat. No. 12,162,425.

(51) Int. Cl.
| | | |
|---|---|---|
| *B60R 21/264* | (2006.01) | |
| *B60R 21/217* | (2011.01) | |
| *B60R 21/26* | (2011.01) | |

(52) U.S. Cl.
CPC ........ *B60R 21/264* (2013.01); *B60R 21/2171* (2013.01); *B60R 2021/2178* (2013.01); *B60R 2021/26029* (2013.01)

(58) Field of Classification Search
CPC .................................................. B60R 21/2644
See application file for complete search history.

(56) References Cited

U.S. PATENT DOCUMENTS

| | | | | |
|---|---|---|---|---|
| 5,621,183 A | * | 4/1997 | Bailey ....................... | F42B 3/18 |
| | | | | 102/202.7 |
| 5,944,545 A | * | 8/1999 | Willhelm ............... | H01R 24/38 |
| | | | | 102/202.2 |
| 6,056,314 A | * | 5/2000 | Shirk ....................... | F42B 3/26 |
| | | | | 280/728.1 |
| 6,073,963 A | | 6/2000 | Hamilton et al. | |
| 6,936,303 B1 | * | 8/2005 | Katsuda .................... | F42B 3/12 |
| | | | | 29/595 |

(Continued)

FOREIGN PATENT DOCUMENTS

| | | |
|---|---|---|
| DE | 112015005576 T5 | 9/2017 |
| EP | 1225415 A1 | 7/2002 |

(Continued)

OTHER PUBLICATIONS

International Search Report and Written Opinion of the ISA issued in PCT/US2024/051216, mailed Jan. 23, 2025; ISA/EU.

*Primary Examiner* — Nicole T Verley
(74) *Attorney, Agent, or Firm* — Stephen T. Olson

(57) ABSTRACT

An initiator for a gas generator of a vehicle safety device. The initiator is actuatable by an electrical power source and includes a cup defining an interior for receiving a pyrotechnic material, and a pair of electrical pins extending from the cup and arranged to be in reaction initiating communication with the pyrotechnic material through a bridge wire. The initiator additionally includes an over-molded body having a first end defining a pocket for receiving the electrical power source and a mounting ring extending around a least a portion of a periphery of the over-molded body. The initiator further includes an electrically conductive member providing electrical communication between the mounting ring and an inner diameter of the pocket. The electrically conductive member is molded in place within the over-molded body.

20 Claims, 2 Drawing Sheets

(56) References Cited

U.S. PATENT DOCUMENTS

| | | | |
|---|---|---|---|
| 7,267,056 B2* | 9/2007 | Takahara | F42B 3/103 |
| | | | 280/741 |
| 7,401,810 B2* | 7/2008 | Brisighella, Jr. | B60R 21/26 |
| | | | 280/736 |
| 11,685,335 B2* | 6/2023 | Noda | B60R 21/2644 |
| | | | 280/741 |
| 11,718,267 B1* | 8/2023 | Wayment | F42B 3/12 |
| | | | 280/741 |
| 11,912,221 B2* | 2/2024 | Peremarty | B60R 21/16 |
| 11,958,432 B2* | 4/2024 | Hirano | B60R 21/2644 |
| 12,038,258 B2* | 7/2024 | Yonezawa | F16B 4/00 |
| 2002/0069783 A1* | 6/2002 | Avetisian | F42B 3/125 |
| | | | 102/202.7 |
| 2003/0066583 A1* | 4/2003 | Hamilton | C06D 5/06 |
| | | | 149/77 |
| 2005/0126416 A1* | 6/2005 | Clark | F42B 3/195 |
| | | | 102/202.12 |
| 2006/0017269 A1* | 1/2006 | Kuroda | B60R 21/26 |
| | | | 280/741 |
| 2019/0360787 A1 | 11/2019 | Gordon et al. | |

FOREIGN PATENT DOCUMENTS

| | | |
|---|---|---|
| EP | 1401063 A1 | 3/2004 |
| EP | 1813906 A1 | 8/2007 |
| EP | 3134298 B1 | 6/2019 |
| EP | 4122778 A1 | 1/2023 |
| FR | 2960958 A1 | 12/2011 |
| JP | 2007521181 A | 8/2007 |
| JP | 2016151318 A | 8/2016 |
| JP | 2022165390 A | 10/2022 |
| KR | 20220144325 A | 10/2022 |
| KR | 102677524 B1 | 6/2024 |
| WO | 9821543 A1 | 5/1998 |
| WO | 9910954 A1 | 3/1999 |
| WO | 0131281 A1 | 5/2001 |
| WO | 0246687 A2 | 6/2002 |
| WO | 2004003457 A1 | 1/2004 |
| WO | 2005007464 A1 | 1/2005 |
| WO | 2005008845 A1 | 1/2005 |
| WO | 2005060454 A2 | 7/2005 |
| WO | 2005095163 A1 | 10/2005 |
| WO | 2012138580 A2 | 10/2012 |
| WO | 2017217464 A1 | 12/2017 |

\* cited by examiner

INITIATOR FOR A GAS GENERATOR OF A VEHICLE SAFETY DEVICE

CROSS REFERENCE TO RELATED APPLICATIONS

The present disclosure is a continuation-in-part of, and claims priority from, U.S. application Ser. No. 18/541,039, filed Dec. 15, 2023, the entire contents of which are hereby incorporated by reference into the present application.

FIELD

The present disclosure generally concerns initiators for gas generators of vehicle safety devices such as inflatable airbags and pretensioned seatbelts. More particularly, the present disclosure relates to an initiator for a gas generator having an electrically conductive member molded in place within an over-molded body to provide a grounding path to the vehicle chassis.

BACKGROUND

This section provides background information related to the present disclosure which is not necessarily prior art.

Inflatable occupant restraint systems, including airbags, are commonly included on motor vehicles for passive occupant protection. Airbags used for frontal impact protection are generally installed in the vehicle steering wheel for the driver and behind the vehicle instrument panel for other front seat occupants. In addition to frontal impact protection, inflatable restraints are used for occupant protection from side impacts. For example, side curtain airbags are typically mounted along the roof rail of a vehicle and deploy in a downward direction to provide an energy absorbing structure between the head and upper torso of an occupant and the vehicle interior components. Side airbags may also be carried by a vehicle seat.

Inflator devices are employed to produce or supply inflation gas for inflating an inflatable airbag in the event of a collision. The inflator devices for such applications often include a gas generant material stored within the housing of the inflator device. The gas generant material is actuated by an initiator when a sensor of the vehicle senses an accident condition (e.g., measures abnormal deceleration). Actuation of the gas generant material triggers inflation of the airbag within a few milliseconds with the produced gas. The inflated airbag cushions the vehicle occupant from impact forces. Initiators are also used for the pretensioning of seatbelts.

While known initiators for occupant restraints have generally proven to be suitable for their intended uses, a continuous need for improvement in the relevant art remains.

SUMMARY

This section provides a general summary of the disclosure and is not a comprehensive disclosure of its full scope or all of its features.

It is a general object of the present teachings to provide an initiator for a gas generator of a vehicle safety device that includes an electrically conductive member molded in place within an over-molded body to provide a grounding path to the vehicle chassis.

In accordance with one particular aspect, the present teachings provide an initiator for a gas generator of a vehicle safety device. The initiator is actuatable by an electrical power source and includes a cup defining an interior for receiving a pyrotechnic material. The initiator also includes a pair of electrical pins extending from the cup and arranged to be in reaction initiating communication with the pyrotechnic material through a bridge wire. The initiator additionally includes an over-molded body having a first end defining a pocket for receiving the electrical power source and a mounting ring extending around a least a portion of a periphery of the over-molded body. The initiator further includes an electrically conductive member providing electrical communication between the mounting ring and an inner diameter of the pocket. The electrically conductive member is molded in place within the over-molded body.

In accordance with another particular aspect, the present teachings provide an initiator for a gas generator of a vehicle safety device that is actuatable by an electrical power source having a ground wire. The initiator includes an over-molded body and a cup. The over-molded body has a first axial end defining a pocket for receiving the electrical power source. The cup defining an interior for receiving a pyrotechnic material and is received within and extends from a second axial end of the over-molded body. The initiator additionally includes a pair of electrical pins axially extending from the cup, through a portion of the over-molded body and into the pocket. The pair of electrical pins is in reaction initiating communication with the pyrotechnic material through a bridge wire. The initiator further includes first and second electrically conductive members. The first electrically conductive member is partially embedded within the over-molded body and radially extending beyond the over-molded body. The second electrically conductive member is molded in place within the over-molded body and provides electrical communication between the first electrically conductive member and an inner diameter of the pocket.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
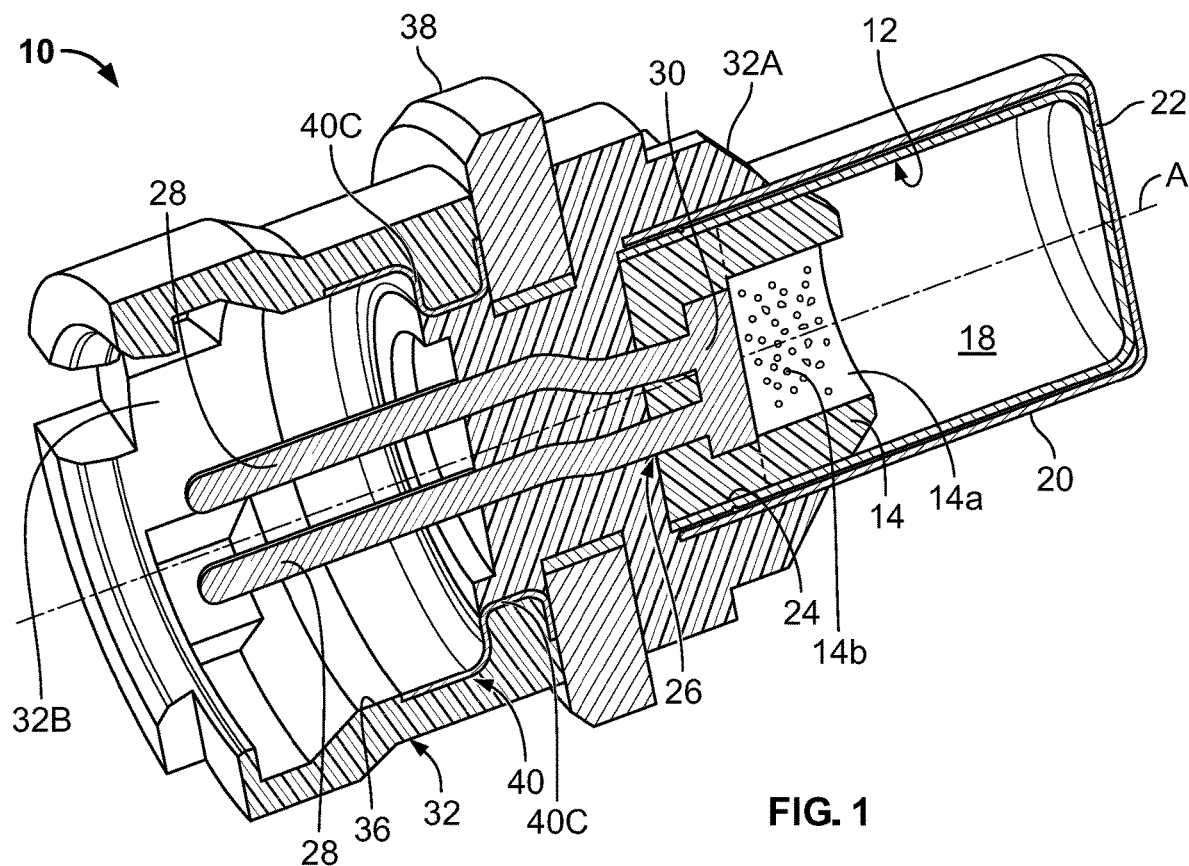
FIG. 1 is a perspective view of an initiator for a gas generator of a vehicle occupant restraint in accordance with the present teachings.

One or more example embodiments will now be described more fully with reference to the accompanying drawings. The one or more example embodiments are provided so that this disclosure will be thorough and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, and that the example embodiment should not be construed to limit the scope of the present disclosure. Well-known processes, well-known device structures, and well-known technologies are not described herein in detail.

The phrases "connected to", "coupled to" and "in communication with" refer to any form of interaction between two or more entities, including mechanical, electrical, magnetic, electromagnetic, fluid, and thermal interaction. Two components may be coupled to each other even though they are not in direct contact with each other. The term "adjacent" refers to items that are in close physical proximity with each other, although the items may not necessarily be in direct contact. The phrase "fluid communication" refers to two features that are connected such that a fluid within one feature is able to pass into the other feature. "Exemplary" as used herein means serving as a typical or representative example or instance, and does not necessarily mean special or preferred.

With reference to drawings, an initiator for a gas generator of a vehicle safety device in accordance with the present teachings is illustrated and generally identified at reference character 10. The initiator 10 may be part of an occupant restraint system of a motor vehicle that includes a gas generator and an inflatable airbag (not particularly shown), for example. The exemplary inflator or pyrotechnical inflator 10 shown in the drawings is particularly well adapted for a side impact restraint system. It will be understood, however, that the initiator 10 described herein may be readily adapted for use with other airbags or with seatbelt pretensioners.

The initiator 10 is generally illustrated to include a cup or case 12 which covers a main pyrotechnic supporting component 14 having a recess 14a. The recess 14a is of a volume selected to contain a desired quantity of a first or primary pyrotechnic material While not illustrated, it will be understood that the initiator 10 also includes a second or secondary pyrotechnic material. The secondary pyrotechnic material is disposed or stored in an interior 18 of the cup 12 immediately adjacent the main or primary pyrotechnic material 14b.

The cup 12 may include a cylindrical sidewall 20. The cylindrical sidewall 20 may extend along an axis A of the initiator 10 between a closed end 22 and an open end 24. The cup 12 may be formed of metal and may be formed by cold striking. In some embodiments, as shown in FIG. 1, the cup 12 may include an inner metal wall 12a and an outer wall 12b. The outer wall 12b may be formed from a suitable plastic which acts as an anti-corrosive surface portion. While not illustrated, it will also be understood that the cup 12 may be formed to include one or more weakened zones that open in response to a pressure from within the cup 12 generated by combustion of the secondary pyrotechnic material.

The primary pyrotechnic material may be in the form of a slurry or in the form of a powder. The secondary pyrotechnic material (not shown) may be a granulated material, including but not limited to a boron based material. It will be understood the particular pyrotechnic materials are outside of the scope of the present teachings and may be selected from various pyrotechnic materials well known in the art to suit specific applications or implementations.

The initiator 10 further includes an ignition device 26. The ignition device 26 conventionally includes a pair of electrical connectors or pins 28 and a bridge wire 30. The pair of electrical pins 28 are in reaction initiating communication with the first pyrotechnic material contained in the recess 14a through the bridge wire 30. In this regard, an electrical current delivered to the pins 28 will increase the temperature of the bridge wire 30, which will transfer heat to the first pyrotechnical material 14b and ignite the first pyrotechnic material.

The cup 12 defines a combustion chamber for the primary pyrotechnic material and the secondary pyrotechnic material. The primary pyrotechnic material is in reaction initiating contact with the bridge wire 30 at a lower or first end of the combustion chamber defined by the cup 12. In this manner, a first end or first axial end of the primary pyrotechnic material 14b is in reaction initiating contact with the bridge wire 30.

The initiator 10 of the present teachings are shown to additionally include a base member or over-molded body 32. The over-molded body 32 is constructed of an electrically insulative material. In one application, the over-molded body 32 may be an injection molded of a glass filled nylon 6 material. Other materials, however, may be used within the scope of the present teachings.

The over-molded body 32 includes a first end or distal end 32A for receiving the cup 12 and a second end or proximal end 32B adapted to receive a power source 34 of the initiator 10, such as a DC power source 34. In a conventional manner, the power source 34 includes a positive wire 34A and a negative wire 34B. Further in a conventional manner, the power source 34 is configured to receive the pins 28 for delivering a current across the bridge wire 30. The second or proximal end 32B of the over-molded body 32 defines a pocket or cavity 36 configured and sized to receive the power source 34 that will be used to power the initiator 10.

Figure 2:
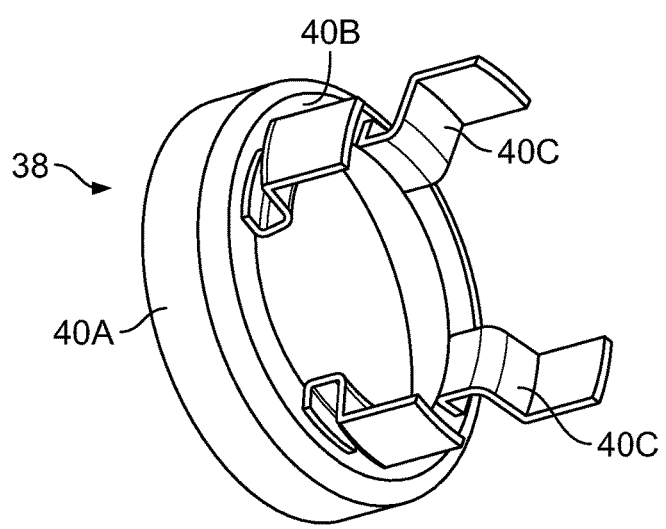
FIG. 2 is a perspective view of an electrically conductive member of the initiator of FIG. 1 shown removed from the initiator for purposes of illustration.
Figure 3:
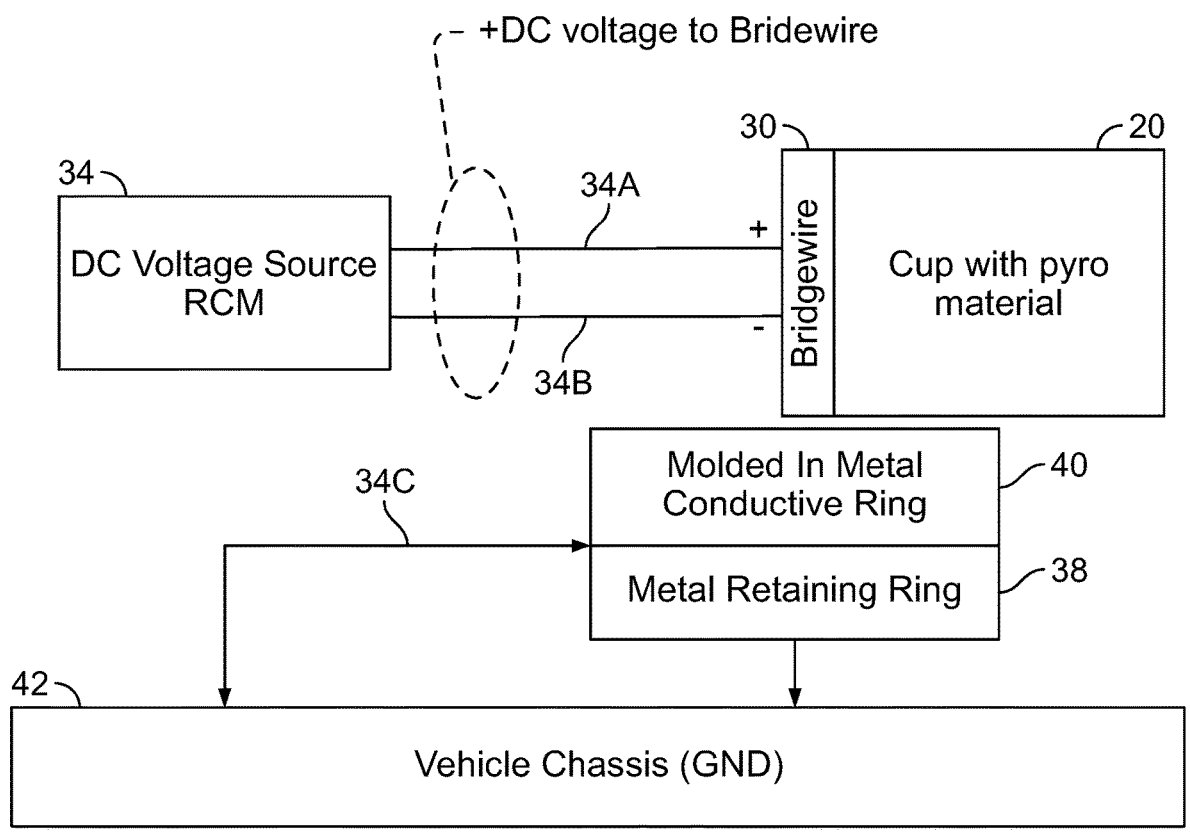
FIG. 3 is a simplified schematic illustration showing the initiator of FIG. 1 operatively associated with a power source and a chassis of a vehicle to ground the power source to the chassis.

The initiator 10 of the present teachings is shown to further include a first electrically conductive member 38. As illustrated, the first electrically conductive member 38 is retaining member or mounting member 38 that extends around a least a portion of a periphery of the over-molded body 32. In the embodiment illustrated, the mounting member is a mounting ring 38 that extends completely around the periphery of the over-molded body 32. The first electrically conductive mounting member 38 is partially embedded within the over-molded body 32 and radially extends beyond the over-molded body 32. With further reference to FIGS. 1-3, the mounting member 38 may be toroidal in shape and may include an outer diameter greater than an adjacent portion of the over-molded body 32 and an inner diameter less than the adjacent portion of the over-molded body 32. The over-molded body 32 may be molded over the mounting ring 38 such that the mounting member 38 radially extends beyond the adjacent portion of the over-molded body 32. In this manner, the mounting ring 38 helps to enable indirect mounting of the initiator 10 to the chassis 42 of the vehicle. The mounting member 38 is constructed of an electrically conductive material, such as but not limited to HSLAS Grade 50 [340] Class1 (High-Strength Low-Alloy Steel, cold rolled steel. A separate grounding conductor or wire 34C may be coupled between the mounting member 38 and the vehicle chassis (GND) 42, as shown in the schematic of FIG. 3.

The initiator 10 of the present teachings is shown to further include a second electrically conductive member 40 that cooperates with the first electrically conductive member 38 for helping, together with the grounding wire 34C, to provide a ground path to the chassis 42, and thereby providing electrical communication between the mounting member 38 and the chassis 42 of the vehicle. The second electrically conductive member 40 includes a first portion in contact with the mounting member 38 and a second portion extending into the pocket 36. In the embodiment illustrated, the electrically conductive member 40 is formed of metal, and in some embodiments from nickel plated 1008 steel, although the conductive member 40 may be formed from other suitably conductive materials as well. The electrically conductive member 40 includes a ring portion having an axially extending cylindrical sidewall 40A and a radially extending flange 40B. The electrically conductive member 40 additionally includes a plurality of contact tabs 40C axially extending from the radially extending flange 40B. The contact tabs include free ends, at least one of which is in physical and electrical contact with the mounting member 38. In the embodiment illustrated, the free ends of a plurality of the contact tabs 40C may be in physical and electrical contact with the mounting member 38. The contact tabs 40C are molded into or embedded within the over-molded body 32. The cylindrical sidewall 40A of the ring portion of the electrically conductive member 40 extends into the pocket 36 and are exposed to the interior of the pocket 36. The ground wire 34C may contact the electrically conductive member 40 through a ring or other structure.

When a predetermined collision event is sensed, an electrical fire signal is delivered to the pins 28 of the ignition device 26. The current of the electrical fire increases the temperature of the bridge wire 30, which then transfers heat into the primary pyrotechnic material 14b resulting in ignition. Ignition of the primary pyrotechnic material 14b creates heat that ignites the secondary pyrotechnic material. Pressure from combustion of the secondary pyrotechnic material opens the weakened zones of the cup 12. The ground wire 34C is electrically connected to the chassis 42 of the vehicle through the mounting ring 38 and the electrically conductive member 40.

While specific embodiments and applications of the present disclosure have been illustrated and described, it is to be understood that the invention is not limited to the precise configuration and components disclosed herein. Various modifications, changes, and variations, which will be apparent to those skilled in the art, may be made in the arrangement, operation, and details of the methods and systems of the present disclosure without departing from the spirit and scope of the disclosure.

What is claimed is:

1. An initiator for a gas generator of a vehicle safety device, the initiator actuatable by an electrical power source, the initiator comprising:
    a cup defining an interior for receiving a pyrotechnic material;
    a pair of electrical pins extending from the cup and arranged to be in reaction initiating communication with the pyrotechnic material through a bridge wire;
    an over-molded body having a first end defining a pocket for receiving the electrical power source;
    a mounting ring extending around a least a portion of a periphery of the over-molded body; and
    an electrically conductive member providing electrical communication between the mounting ring and an inner diameter of the pocket, the electrically conductive member molded in place within the over-molded body.

2. The initiator of claim 1, wherein the electrically conductive member is an electrically conductive ring.

3. The initiator of claim 2, wherein the electrically conductive ring includes a cylindrical flange extending into the pocket.

4. The initiator of claim 3, wherein the cylindrical flange of the electrically conductive ring axially extends parallel to an internal surface of the over-molded body defining the pocket.

5. The initiator of claim 3, wherein the cylindrical flange of the electrically conductive ring is flush against an internal surface of the over-molded body defining the pocket.

6. The initiator of claim 2, wherein the electrically conductive ring further includes a plurality of contact tabs.

7. The initiator of claim 6, wherein the contact tabs are embedded in the over-molded body and each said contact tab includes a portion in direct contact with the mounting ring.

8. The initiator of claim 1, wherein the electrically conductive member is a ring portion having an axially extending cylindrical sidewall and a radially extending flange.

9. The initiator of claim 8, wherein the electrically conductive member further includes at least one tab axially extending from the radially extending flange, said tabs including a free end in physical and electrical contact with the mounting ring.

10. The initiator of claim 9, wherein the tab is embedded within the over-molded body.

11. The initiator of claim 1, in combination with the electrical power source.

12. The initiator of claim 11, further comprising a ground wire in electrical communication with the mounting ring through the electrically conductive member, and with a vehicle chassis.

13. An initiator for a gas generator of a vehicle safety device, the initiator actuatable by an electrical power source, the initiator comprising:
    an over-molded body having a first axial end defining a pocket for receiving the electrical power source;
    a cup defining an interior for receiving a pyrotechnic material, the cup received within and extending from a second axial end of the over-molded body;
    a pair of electrical pins axially extending from the cup, through a portion of the over-molded body and into the pocket, the pair of electrical pins in reaction initiating communication with the pyrotechnic material through a bridge wire;
    a first electrically conductive member partially embedded within the over-molded body and radially extending beyond the over-molded body; and
    a second electrically conductive member providing electrical communication between the first electrically conductive member and an inner diameter of the pocket, the second electrically conductive member molded in place within the over-molded body.

14. The initiator of claim 13, wherein the first electrically conductive member is toroidal in shape.

15. The initiator of claim 14, wherein the first electrically conductive member has an outer diameter greater than an adjacent portion of the over-molded body and an inner diameter less than the adjacent portion of the over-molded body.

16. The initiator of claim 13, wherein the second electrically conductive member includes a first portion in contact with first electrically conductive member and a second portion extending into the pocket.

17. The initiator of claim 16, wherein the second electrically conductive member includes a ring portion having an axially extending cylindrical sidewall and a radially extending flange.

18. The initiator of claim 17, wherein the second electrically conductive member further includes a plurality of contact tabs axially extending from the radially extending flange, each said contact tab including free ends in physical and electrical contact with the mounting ring.

19. The initiator of claim 18, wherein the contact tabs are embedded within the over-molded body.

20. The initiator of claim 13, in combination with the electrical power source.

* * * * *